United States Patent [19]

Takahashi

[11] 4,395,120

[45] Jul. 26, 1983

[54] METHOD OF AND APPARATUS FOR MEASURING THE REFRACTIVE POWER OF A CONTACT LENS

[75] Inventor: Fumio Takahashi, Yokohama, Japan

[73] Assignee: Nippon Kogaku K.K., Toyko, Japan

[21] Appl. No.: 231,029

[22] Filed: Feb. 3, 1981

Related U.S. Application Data

[63] Continuation of Ser. No. 954,207, Oct. 24, 1978, abandoned.

[30] Foreign Application Priority Data

Sep. 1, 1977 [JP] Japan .................. 52-104191
Oct. 28, 1977 [JP] Japan .................. 52-128628
Oct. 13, 1978 [JP] Japan .................. 53-12589

[51] Int. Cl.$^3$ .............................................. G01B 9/00
[52] U.S. Cl. .................................................. 356/125
[58] Field of Search .................. 356/124, 125, 128; 351/178

[56] References Cited

U.S. PATENT DOCUMENTS

| | | | |
|---|---|---|---|
| 1,241,612 | 10/1917 | Emerson | 356/127 |
| 3,445,169 | 5/1969 | Lueck | 356/124 |
| 3,820,899 | 6/1974 | McCormack | 356/124 |
| 3,985,445 | 10/1976 | Tagnon | 356/125 |
| 4,072,428 | 2/1978 | Moss | 356/125 |

Primary Examiner—Bruce Y. Arnold
Attorney, Agent, or Firm—Fitzpatrick, Cella, Harper & Scinto

[57] ABSTRACT

Measurement of the refractive power of a contact lens comprises joining a contact lens to be measured with the surface of a reference lens system of small refractive power whose optical elements are known, and then measuring the back focal distance of the combined optical system to thereby determine the refractive power of the contact lens to be measured.

19 Claims, 8 Drawing Figures

METHOD OF AND APPARATUS FOR MEASURING THE REFRACTIVE POWER OF A CONTACT LENS

This is a continuation, of application Ser. No. 954,207, filed Oct. 24, 1978 now abandoned;

BACKGROUND OF THE INVENTION

1. Field of the Invention

This invention relates to a method of and an apparatus for measuring the refractive power of a contact lens, particularly, a soft contact lens.

2. Description of the Prior Art

A lens meter for measuring the refractive power of spectacles lenses has heretofore been used to measure the refractive power of a contact lens, but this method is limited to the case of the so-called hard contact lens which is formed of hard material such as PMMA (polymethyl methacrylate) and which is small in amount of deformation. On the other hand, in the case of a flexible hydrophilic soft contact lens formed typically of HEMA (2-hydroxyethyl methacrylate), it is difficult to measure the refractive power thereof by the use of a lens meter as in the case of a hard contact lens, due to the effect of drying and instability of shape attributable to the flexibility when the soft contact lens is taken out of the preservation liquid such as physiological saline solution. Even if the measurement could be made, there is a problem of accuracy because the shape of the soft contact lens is unstable. For these reasons, the immersion method using physiological saline solution or the like has been proposed for the measurement of a hydrophilic soft contact lens. In this method, the amount of deformation of the lens is much smaller than it is in the air because the specific gravity of the liquid is approximately that of the soft contact lens but, nevertheless the refractive indices of the lens and the liquid must be previously known to find a rough value. If these are unknown, comparative measurement of the degree of the refractive power of the lens can be made, whereas the value of the refractive power itself cannot be obtained. Other various measuring methods have been considered, but various problems are still left to be solved such as the fact that measurement cannot be made of a lens whose refractive index is unknown, that the accurancy of measurement is low because the difference in refractive index between the liquid and the lens is small, and that handling is cumbersome.

SUMMARY OF THE INVENTION

It is an object of the present invention to provide a method of and an apparatus for simply and accurately measuring the refractive power of a soft contact lens formed of a material whose refractive elements are unknown.

The method of measuring the refractive power of a contact lens according to the present invention comprises joining a soft contact lens to be measured with the surface of a reference lens system whose optical refractive elements are known, and then measuring the back focal distance of the combined optical system (the distance from the vertex of the last refractive surface of the lens to the focus thereof), thereby finding the refractive power of the contact lens to be measured.

The invention will become more fully apparent from the following detailed description thereof taken in conjunction with the accompanying drawings.

DESCRIPTION OF THE PREFERRED EMBODIMENTS

PRINCIPLE OF THE INVENTION

Figure 1:
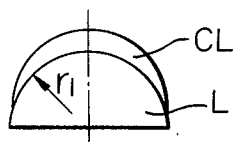
FIG. 1 shows an example in which a soft contact lens is brought into intimate contact with a reference lens system.

In FIG. 1, a soft contact lens (hereinafter simply referred to as the contact lens) CL is in intimate contact with a reference lens system L. The reference lens system L is a simple plano-convex lens. If the radius of curvature of that surface of the reference lens system L adjacent to the contact lens (which surface is a first surface) is $r_1$, the center thickness thereof is $d_1$ and the refractive index thereof is $n_1$, then the refractive power $\psi$ of the contact lens CL is given by the following equation:

$$\phi = \frac{1}{\frac{d_1}{n_1} + l} - \phi'_1 \tag{1}$$

$$\left( \phi'_1 = \frac{n_1 - 1}{r_1} \right)$$

Here, $\psi_1'$ is the refractive power of the first surface of the reference lens system and $l$ is the back focal distance of the combined lens system of the contact lens CL and the reference lens system L. As is seen from this equation, if the radius of curvature $r_1$ of the first surface, the center thickness $d_1$ thereof and the refractive index $n_1$ thereof which are the optical refractive elements of the reference lens system are known, the refractive power $\psi$ can be obtained by measuring the back focal distance $l$ of the combined lens system. Equation (1) does not include the variables such as the curvature radius, center thickness and refractive index which are the optical refractive elements of the contact lens CL. Therefore, even if the refractive elements of the contact lens are unknown, the refractive power thereof can be obtained.

If $l$ is replaced by $1/D$ in equation (1), with $D$ the power in diopters, the refractive power $\psi$ can be expressed as:

$$\psi = -\frac{A'_1}{B'_1} - \psi'_1 \tag{2}$$

-continued
$$\begin{cases} A'_1 = -D \\ B'_1 = 1 + \dfrac{d_1}{n_1} \cdot D \end{cases}$$

The refractive power D of the combined lens system can be measured by the use of the well-known principle of the lens meter. This measurement value is generally in diopters and so, by using equation (2), the refractive power $\psi$ of the contact lens to be inspected can be easily obtained. Also, if the value of $\psi$ which satisfies equation (2) for various values of the refractive power D of the combined lens system is previously given on the division, the value of the refractive power $\psi$ of the contact lens can be directly read out.

Figure 2:
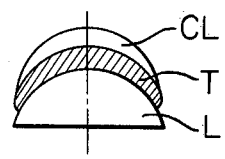
FIG. 2 shows an example in which a medium is interposed between the soft contact lens and the reference lens system.

In FIG. 1, the contact lens CL is shown in direct contact with the plano-convex lens as the reference lens system L. However, it is possible to measure the refractive power of the contact lens in its condition as actually worn, i.e., when on the eye of the user, by interposing a medium T such as water or physiological saline solution between the two lenses as shown in FIG. 2. This is because, when worn, the clearance between the contact lens and the cornea of an eye is filled with tear liquid, and by regarding the intermediate medium T as the tear liquid of the eye, the measurement value can be interpreted as a composite refractive power containing the layer of tear liquid.

The plano-convex lens itself has a very strong positive refractive power so that the refractive power per se of the combined optical system comprising a plano-convex lens in contact with a contact lens becomes strong enough to go beyond the measurement range of the lens meter usually used and it is thus impossible to simply measure it. Therefore, if a lens of a small refractive power is used as the reference lens system, the measurement can be effected by using the conventional lens meter intactly. It is therefore desirable to form the reference lens system by a plurality of lenses including a concave lens disposed behind the aforementioned plano-convex lens.

Figure 3:
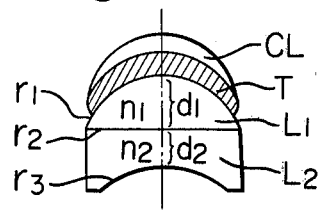
FIG. 3 shows an example in which use is made of a reference lens system comprising a plano-convex lens cemented to a plano-concave lens.

As a simple case, description will be made of the case as shown in FIG. 3 wherein the reference lens system is formed by a plano-convex lens $L_1$ such as described above and a plano-concave lens $L_2$ cemented together. If the curvature radii of the successive surfaces of the reference lens system from that side adjacent to the contact lens are $r_1, r_2, r_3$, the center thicknesses thereof are $d_1$ and $d_2$, and the refractive indices thereof are $n_1$ and $n_2$, then the refractive power $\psi$ of the contact lens to be obtained is expressed as follows, because $r_2 \infty$.

$$\psi = -\frac{A_2}{B_2} - \psi'_1 \text{ where} \tag{3}$$

$$A_2 = [\psi_3, -l]$$

$$B_2 = \left[\left(-\frac{d_1}{n_1} - \frac{d_2}{n_2}\right), \psi_3, -l\right]$$

$$\psi_3 = \frac{1 - n_2}{r_3}$$

$A_2$ and $B_2$ are the values of the refractive elements of the reference lens system comprising a plano-convex lens and a plano-concave lens expressed in the form of Gaussian brackets. The expression method of Gaussian brackets such as [. . .] is fully described in the article entitled "Gaussian Optics and Gaussian Brackets" by M. Herzberger (*Journal of Optical Society of America,* Vol. 33, 1943, pp. 651–655). If only the values of the refractive elements of the reference lens system are known, the refractive power $\psi$ of the contact lens can be obtained by measuring the back focal distance l of the combined lens system as in the case of a single plano-convex lens. If $D = 1/l$ is placed in and the diopter expression is used, the refractive power is as follows:

$$\psi = -\frac{A'_2}{B'_2} - \psi'_1 \text{ where} \tag{4}$$

$$A'_2 = -\psi_3 + D$$

$$B'_2 = -\left[\left(-\frac{d_1}{n_1} - \frac{d_2}{n_2}\right), \psi_3\right] + \left(-\frac{d_1}{n_1} - \frac{d_2}{n_2}\right) \cdot D$$

Figure 4:
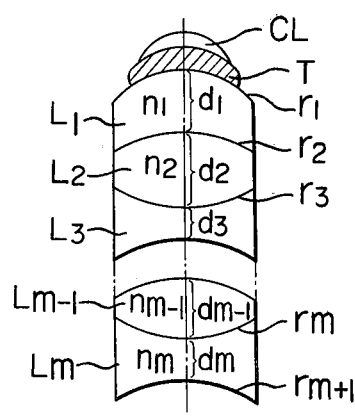
FIG. 4 shows an example of the reference lens system comprising m lenses.

Although the reference lens system may be provided by a meniscus lens, it is desirable to divide the reference lens system into the above-described plano-convex lens and plano-concave lens in order to avoid manufacturing problems and enhance the lens performance. It is also possible to make the second surface curved in order to maintain the aberrations of the reference lens system in better condition, and it is further possible to form the reference lens system by a combination of more lenses as shown in FIG. 4. In a general case as shown in FIG. 4 wherein the reference lens system comprises m lenses such as lenses $L_1, L_2, \ldots, L_m$ (including air lenses as well), and if the radii of curvature of the successive surfaces from the first surface are $r_1, r_2, \ldots, r_m, r_{m+1}$, the center thicknesses thereof are $d_1, d_2, \ldots, d_m$, and the refractive indices thereof are $n_1, n_2, \ldots, n_m$, then the refractive power $\psi$ of the contact lens to be obtained is expressed as:

$$\psi = -\frac{A_m}{B_m} - \psi'_1 \tag{5}$$

$$\left(\psi'_1 = \frac{n_1 - 1}{r_1}\right) \text{ where}$$

$$A_m = \left[\psi_2, -\frac{d_2}{n_2}, \ldots, -\frac{d_m}{n_m}, \psi_{m+1}, -l\right]$$

$$B_m = \left[-\frac{d_1}{n_1}, \psi_2, -\frac{d_2}{n_2}, \ldots, -\frac{d_m}{n_m}, \psi_{m+1}, -l\right]$$

$$\left(\psi_i = \frac{n_{i-1} - n_i}{r_i}, i = 2, 3, 4, \ldots, m+1\right)$$

$\psi_i$ is the refractive power of the ith surface.

Where $D = 1/l$ is substituted into the equation, $\psi$ becomes as follows:

$$\psi = -\frac{A'_m}{B'_m} - \psi' \text{ where} \tag{6}$$

$$A'_m = -\left[\psi_2, -\frac{d_2}{n_2}, \ldots, -\frac{d_m}{n_m}, \psi_{m+1}\right] +$$

-continued $$B'_m = - \left[ -\frac{d_1}{n_1}, \psi_2 - \frac{d_2}{n_2}, \ldots, -\frac{d_m}{n_m}, \psi_{m+1} \right] +$$

$$\left[ \psi_2, -\frac{d_2}{n_2}, \ldots, -\frac{d_m}{n_m} \right] \cdot D$$

$$\left[ -\frac{d_1}{n_1}, \psi_2, -\frac{d_2}{n_2}, \ldots, -\frac{d_m}{n_m} \right] \cdot D \quad 10$$

Thus, in the general case also, an equation similar to the equations (1) and (2) or (3) and (4) is established and if the values of the optical elements of the reference lens system are known, the refractive power $\psi$ of the contact lens can be determined from this equation even though the refractive elements of the contact lens are unknown.

Generally, the curvature of the cornea differs from person to person and so, contact lenses are produced with various curvatures for that surface of the contact lens which is adjacent to the cornea (hereinafter referred to as the second surface of the contact lens).

Consequently, it is desirable to prepare several reference lens systems having different curvature radii of the first surface thereof in accordance with the curvatures of the second surface of the contact lens to be inspected, and the contact lenses having different curvature radii of the second surface can also be measured simply and accurately by entirely the same method as described.

When measurement is effected by the use of a different reference lens system, $n_1$, $d_1$ and $r_1$ becomes different in equation (1) or (2) and $\psi$ is calculated by obtaining $l$ or $D$ which is the measurement value as regards these values. If the value of $(d_1)/(n_1)$, which is the ratio of the center thickness to the refractive index is made constant, the value of the refractive power $\psi$ can be obtained even for a reference lens system having a different curvature radius of the first surface by converting only the terms of $\psi_1'$ resulting only from a variation in the curvature radius of the first surface in equation (1) or (2). The correction of the term $\psi_1'$ is a very simple one in which only a constant value is adjusted. Also, in an actual measurement, wherein the value of $\psi$ is directly read from the measurement of the combined refractive power, the refractive power of a contact lens having a different curvature radius of the second surface can be obtained by imposing such a specific relationship and by a simple operation of parallel-moving the scale plate.

Even in a case where the reference lens system is formed by a plano-convex lens and a plano-concave lens as shown in FIG. 3, if $(d_1)/(n_1)$ is constant when a different curvature radius of the first surface of the plano-convex lens is used in accordance with the variation in curvature of the second surface of the constant lens, the value of the refractive power $\psi$ of the contact lens can be easily obtained simply by correcting the value of $\psi_1'$ even though the curvature radius $r_1$ of the first surface of the reference lens system is varied. In this case, the plano-concave lens need not be changed at all. Therefore, where measurement is made of a contact lens having a different curvature radius of the second surface, only the plano-convex lens need be changed and the plano-concave lens can be common to all plano-convex lenses.

This is also possible in the above-described general reference lens system comprising m lenses. It is possible to measure a contact lens having a different curvature of the second surface by changing only the first lens $L_1$ having a surface joined to the second surface of the contact lens CL to be inspected (namely, the first surface) like the above-described plano-convex lens. If the ratio $d_1/n_1$ of the center thickness $d_1$ to the refractive index $n_1$ of the interchangeable first lens $L_1$ is maintained constant and the refractive power $\psi_2$ of the second surface is maintained equal, the measurement value can be easily converted to obtain the value of the refractive power as in the previously described case even if the curvature of the second surface of the contact lens to be inspected is varied.

Also, if the coefficient of D in the denominator $B_m'$ of equation (6) is 0, the relation between the refractive power $\psi$ of the contact lens and the refractive power D of the combined lens system becomes linear to permit of the conversion very easily. The inter-division interval becomes constant and it becomes very easy to manufacture a scale plate for reading out the value of $\psi$ directly from the value of D. It is therefore desirable to select the refractive elements of an auxiliary lens so that the coefficient of D of the denominator $B_m'$ in equation (6) is 0, and to minimize, if not nullify, the absolute value of this value.

However, where compensation is effected simply by parallel-moving the scale plate by a correction value of $\psi_1'$ by the use of a reference lens system which satisfies the above-described conditions, the intervals between the neighboring two graduations in the scale plate are not equal because $\psi$ and D are not in linear relation with each other as seen from equation (2) and an error is created when the scale plate is simply parallel-moved. Particularly, when the value of D is great, the value of the error is not permissible and thus, measurement with a good accuracy becomes impossible. Accordingly, in order that the refractive power of a contact lens may be measured with a high accuracy, cumbersome compensation of the term of $\psi_1'$ is indispensable and this is disadvantageous for carrying out a quick measurement.

Reference Lens System Compensation Elimination

Reference lens systems which eliminate cumbersome compensations in the measurement of various contact lenses, with the curvatures of the second lenses thereof being different from each other, may be provided by the following construction.

In the case where there are two reference lens systems whose first surfaces have the curvature radii $r_1$ and $r_{1a}$ ($r_1 \neq r_{1a}$) respectively, and each of which is composed of a single lens, such compensation-free reference lens systems are so constructed that each system has zero refractive power; that is, no refractive power and satisfy the following two conditions:

$$\left[ -\frac{d_1}{n_1} \right] = \left[ -\frac{d_{1a}}{n_{1a}} \right] \quad (7)$$

$$\left[ \psi'_1, -\frac{d_1}{n_1} \right] = \left[ \psi'_{1a}, -\frac{d_{1a}}{n_{1a}} \right] \quad (8)$$

where $d_1$ is the center thickness of the reference lens system having a curvature radius $r_1$ of the first surface, $n_1$ is the refractive index of such reference lens, and $d_{1a}$ and $n_{1a}$ are the center thickness and the refractive index, respectively, of the reference lens system having a curvature radius $r_{1a}$ of the first surface. Here again, equation (7) is the expression of the refractive elements of the respective reference lens systems in the form of Gaussian brackets, and equations (7) and (8) are both expressed so that their correspondence with the general consideration, which will hereinafter be described, can be readily understood. Here, $\psi_1'$ and $\psi_{1a}'$ represent the surface refractive powers of the first surfaces of the respective reference lens systems and like $\psi_1'$, $\psi_{1a}'$ is given as:

$$\psi'_{1a} = \frac{n_{1a} - 1}{r_{1a}}$$

It will hereinafter be verified that any compensation is made unnecessary by such a construction even in the case where use is made of a reference lens system having a different curvature radius of the first surface or in the case where the curvature radius of the second surface of the contact lens to be inspected is different.

The aforementioned equation (2) shows the relation when a simple plano-convex lens is used as the reference lens system as shown in FIG. 1, but in this construction, the refractive power of the reference lens system itself must be zero and this makes it impossible to form the reference lens system using a single plano-convex lens. That is, the second surface of the reference lens system must also be a curved surface and for such a reference lens system, if $r_1$ and $r_2$ are the curvature radii of the first and second surfaces and $d_1$ and $n_1$ are the center thickness and the refractive index, the following relation which is smaller to equation (2) is established:

$$\psi = -\frac{A'_1}{B'_1} - \psi'_1 \qquad (9)$$

where
$$\begin{cases} A'_1 = \psi_2 - D \\ B'_1 = 1 + \frac{d_1}{n_1} \cdot D - \frac{d_1}{n_1} \cdot \psi, \\ \psi'_1 = \frac{n_1 - 1}{r_1}, \psi_2 = \frac{1 - n_1}{r_2} \end{cases}$$

Since the refractive power of the reference lens system is zero, the following equation is established:

$$\frac{\psi'_1}{\left[\psi'_1, -\frac{d_1}{n_1}\right]} + \psi_2 = 0 \qquad (10)$$

Hence, $\psi_2 = -\dfrac{\psi'_1}{\left[\psi'_1, -\dfrac{d_1}{n_1}\right]}$

If this equation is placed in equation (9) and rearranged, $\psi$ may be expressed as:

$$\psi = \frac{E^2 D}{1 - E \cdot F \cdot D} \qquad (11)$$

where
$$\begin{cases} E = \left[\psi'_1, -\dfrac{d_1}{n_1}\right] \\ F = -\dfrac{d_1}{n_1} \end{cases}$$

Also, if the refractive power of a contact lens having a different curvature radius of the second surface is measured by the use of a reference lens system having a curvature radius $r_{1a}$ of the first surface, a center thickness $d_{1a}$ and a refractive index $n_{1a}$, then the refractive power $\psi_a$ is expressed as follows, with the refractive power of the combined system with the reference lens system being $D_a$:

$$\psi_a = \frac{E_a^2 \cdot D_a}{1 - E_a \cdot F_a \cdot D_a} \qquad (12)$$

where
$$\begin{cases} E_a = \left[\psi'_{1a}, -\dfrac{d_{1a}}{n_{1a}}\right] \\ F_a = -\dfrac{d_{1a}}{n_{1a}} \end{cases}$$

If equations (7) and (8) are satisified, the following relations are established:

$$E = E_a, \; F = F_a$$

Accordingly, equation (12) becomes $$\psi_a = \frac{E^2 \cdot D_a}{1 - E \cdot F \cdot D_a} \qquad (12')$$

When equation (12') is compared with equation (11), the coefficients of $D_a$ and $D$ are identical and so, it can be seen that $\psi_a$ and $D_a$ satisfy the relations equal to $\psi$ and $D$. That is, if equations (7) and (8) are satisfied, there is no necessity of converting the measurement value obtained by the use of a reference lens system having a curvature radius $r_1$ of the first surface and the measurement value obtained by the use of a reference lens system having a curvature radius $r_{1a}$ of the first surface.

The conditions of equations (7) and (8) should be satisifed where the reference lens system is a single lens, and a specific construction in such a case will now be considered.

Gaussian brackets of equation (8) may be developed into $$1 - \frac{d_1}{n_1} \cdot \psi'_1 = 1 - \frac{d_{1a}}{n_{1a}} \cdot \psi'_{1a}$$

Here, by equation (7), the following is obtained:

$$\psi'_1 = \psi'_{1a}$$

Thus, it is seen that the following is established from the definitiions of $\psi_1'$ and $\psi_{1a}'$:

$$\frac{n_1 - 1}{r_1} = \frac{n_{1a} - 1}{r_{1a}} \text{ namely, } \frac{r_{1a}}{r_1} = \frac{n_{1a} - 1}{n_1 - 1}$$

This equation means that the curvature radius $r_{1a}$ of the first surface of the reference lens system is primarily determined by the refractive index $n_{1a}$ of the reference lens system. In other words, the curvature radius $r_{1a}$ of the first surface of the reference lens system depends on the value of the refractive index $n_{1a}$ and therefore, it is only possible to construct a reference lens system having a radius curvature of the first surface corresponding to the refractive index of the existing optical substance.

The curvature radius of the first surface of the reference lens system must be equal to the curvature radius of the second surface of the contact lens, but it is difficult to accurately measure it where there is no optical substance having a refractive index accurately corresponding thereto. However, this problem may be solved by forming the reference lens system using two or more lenses instead of forming the reference lens system using only a single lens. Description will hereinafter be made of the general case where the reference lens system is formed by a plurality of lenses as shown in FIG. 4.

Let two reference lens systems be provided, one of which comprises k lenses (including air lenses) having a curvature radius $r_1$ of the first surface, and the other comprises m lenses having a curvature radius $r_{1a}$ of the first surface which differs from $r_1$. First, composite refractive powers of the two reference lens systems are respectively zero. Further, let $r_1, r_2 \ldots, r_k, r_{k+1}$ be the curvature radii of the successive lens surfaces of the reference lens system having the curvature radius $r_1$ of the first surface, $d_1, d_2, \ldots, d_k$ be the center thicknesses of the successive lenses, and $n_1, N_2, \ldots, n_k$ be the refractive indices of the successive lenses. Also, let $r_{1a}, r_{2a}, \ldots, r_{ma}, r_{(m+1)a}$ be the curvature radii of the successive lens surfaces of the reference lens system having the curvature radius $r_{1a}$ of the first surface, $d_{1a}, d_{2a}, \ldots, d_{ma}$ be the center thicknesses of the successive lenses, and $n_{1a}, n_{2a}, \ldots, n_{ma}$ be the refractive indices of the successive lenses. Then, the reference lens system are constructed so as to satisfy the following two conditions:

$$\left[ \psi'_1, -\frac{d_1}{n_1}, \psi_2, -\frac{d_2}{n_2}, \ldots, \psi_k, -\frac{d_k}{n_k} \right] = \quad (13)$$

$$\left[ \psi'_{1a}, -\frac{d_{1a}}{n_{1a}}, \psi_{2a}, -\frac{d_{2a}}{n_{2a}}, \ldots, \psi_{ma}, -\frac{d_{ma}}{n_{ma}} \right]$$

$$\left[ -\frac{d_1}{n_1}, \psi_2, -\frac{d_2}{n_2}, \psi_3, \ldots, \psi_k, -\frac{d_k}{n_k} \right] = \quad (14)$$

$$\left[ -\frac{d_{1a}}{n_{1a}}, \psi_{2a}, -\frac{d_{2a}}{n_{2a}}, \psi_{3a}, \ldots, \psi_{ma}, -\frac{d_{ma}}{n_{ma}} \right]$$

where $$\psi'_1 = \frac{n_1 - 1}{r_1}, \quad \psi'_{1a} = \frac{n_{1a} - 1}{r_{1a}}$$

$$\psi_i = \frac{n_i - n_{i-1}}{r_i}, \quad \psi_{ia} = \frac{n_{ia} - n_{(i-1)a}}{r_{ia}}$$

$(i = 2, 3, \ldots)$

Assume that measurement is effected by the use of a reference lens system L comprising k lenses. The refractive power $\psi$ of the contact lens to be inspected is given in the same form as equation (5) as follows, with $D$ being the refractive power of the combined system with the reference lens system.

$$\psi = -\frac{A'_k}{B'_k} - \psi'_1 \text{ where} \quad (15)$$

$$A'_k = -\left[ \psi_2, -\frac{d_2}{n_2}, \psi_3, \ldots, -\frac{d_k}{n_k}, \psi_{k+1} \right] +$$

$$\left[ \psi_2, -\frac{d_2}{n_2}, \psi_3, \ldots, \psi_k, -\frac{d_k}{n_k} \right] \cdot D$$

$$B'_k = \left[ -\frac{d_1}{n_1}, \psi_2, -\frac{d_2}{n_2}, \ldots, -\frac{d_k}{n_k}, \psi_{k+1} \right] +$$

$$\left[ -\frac{d_1}{n_1}, \psi_2, -\frac{d_2}{n_2}, \ldots, \psi_k, -\frac{d_k}{n_k} \right] \cdot D$$

$$\psi'_1 = \frac{n_1 - 1}{r_1}, \quad \psi_i = \frac{n_i - n_i - 1}{r_i}$$

$(i = 2, 3, \ldots, k+1)$

By the condition that the reference lens system be formed such that the refractive power of the reference lens system itself is zero, equation (15) may be expressed in a form similar to equation (11):

$$\psi = \frac{E_k^2 \cdot D}{1 - E_k \cdot F_k \cdot D} \text{ where} \quad (16)$$

$$E_k = \left[ \psi'_1, -\frac{d_1}{n_1}, \psi_2, -\frac{d_2}{n_2}, \ldots, \psi_k, -\frac{d_k}{n_k} \right]$$

$$F_k = \left[ -\frac{d_1}{n_1}, \psi_2, -\frac{d_2}{n_2}, \psi_3, \ldots, \psi_k, -\frac{d_k}{n_k} \right]$$

Likewise, the refractive power $\psi_a$ of the contact lens measured by the use of a reference lens system having a curvature radius $r_{1a}$ of the first surface may be expressed as follows, with $D_a$ being the refractive power of the combined system, if the refractive power of the reference lens system itself is zero:

$$\psi_a = \frac{E_{ma}^2 \cdot D_a}{1 - D_{ma} \cdot F_{ma} \cdot D_a} \text{ where} \quad (17)$$

$$E_{ma} = \left[ \psi'_{1a}, -\frac{d_{1a}}{n_{1a}}, \psi_{2a}, -\frac{d_{2a}}{n_{2a}}, \ldots, \psi_{ma}, -\frac{d_{ma}}{n_{ma}} \right]$$

$$F_{ma} = \left[ -\frac{d_{1a}}{n_{1a}}, \psi_{2a}, -\frac{d_{2a}}{n_{2a}}, \psi_{3a}, \ldots, \psi_{ma}, -\frac{d_{ma}}{n_{ma}} \right]$$

From equations (13) and (14), the following are established:

$$E_k = E_{ma}, \quad F_k = F_{ma}$$

and it is seen that no conversion is necessary with respect to $\psi$ and $\psi_a$ as in the case of a reference lens system comprising a single lens. If use is made of the so constructed reference lens system comprising a plurality of lenses, no conversion and correction is necessary with respect to the contact lens having a different curvature radius of the second surface except changing the reference lens system, there is high degree of freedom with which the refractive elements satisfying the equations (13) and (14) are selected, and it is possible to construct a reference lens system which eliminates the necessity of conversion with respect to any $r_1$ and $r_{1a}$.

Also, in this case, if the conventional lens meter is previously provided with a division of the value of $\psi$ obtained by equation (16) described in the general consideration, the refractive power of the contact lens to be inspected can, be directly read out and, even if the reference lens system is changed, there is no necessity of correcting the division. Measurement of a contact lens having a different curvature radius of the second surface can also be simply made.

Now, generally, a measuring apparatus soft contact lens, when worn, follows the shape of the cornea due to its own flexibility, and it is considered that the contact lens is often worn in a deformed shape. It is sometimes desired to measure the refractive power of the contact lens in its deformed shape, namely, the refractive power of the contact lens as it is worn. In this case, it is possible to have an approximate value with a considerable accuracy by measuring the contact lens by the use of a reference lens system having the same curvature radius of the first surface as that of the cornea of the eye to be examined. In this method, it is necessary to prepare numerous reference lens systems having different curvature radii of the first surface, as noted previously. However, as a simple method, it is possible to measure the contact lens by the use of various reference lens systems having different specific values for the curvature radius of the first surface, plot the refractive powers obtained from these measurement values on a graph, depict a curve passing through these values and thereby obtain the refractive power of a contact lens having any desired curvature of the second surface. Of course, it is more desireable to make the first surface into a nonspherical shape similar to the shape of the cornea surface.

The apparatus for measuring the refractive power of the contct lens according to the present invention includes a reference lens as described above, and a lens meter for measuring the refractive power or the back focal distance of a combined optical system of a contact lens to be inspected combined with the reference lens system. A conventional lens meter may be used.

Figure 5:
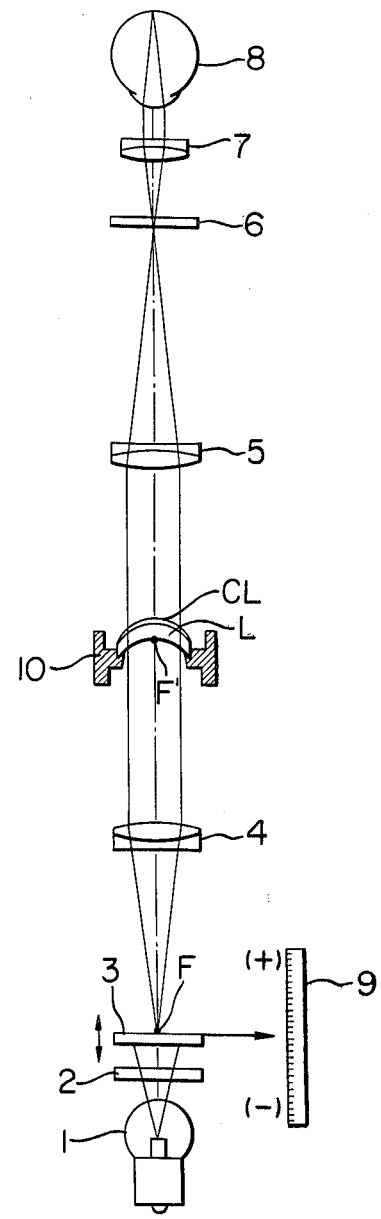
FIG. 5 schematically shows the construction of an apparatus for measuring the refractive power of a contact lens according to the present invention.

FIG. 5 schematically shows the construction of the measuring apparatus according to the present invention. The principle of a lens meter, as is well-known, is such that a lens to be inspected is disposed at the back focus F' of a collimater lens and a target image is formed on a focusing plate by an objective lens through said lenses so that the refractive power of the lens to be inspected is obtained from the amount of movement of the target from a reference point (the front focus F of the collimater lens). The light from a light source 1 illuminates the target 3 through a filter 2. The target 3 is movable along the optic axis with the front focus F of the collimater lens 4 as the reference position, and when in its reference position, the light from the target 3 passes through the collimater lens 4, whereafter it becomes a parallel beam. An objective lens 5 condenses the parallel beam onto a focusing plate 6 and forms the image of the target thereat. This image is observed by an inspector 8 through an eyepiece 7. By a support means 10 provided between the collimater lens 4 and the objective lens 5, a reference lens system L to which the contact lens CL to be inspected is joined is disposed in the optical path. The inspector moves the target 3 so that the image of the target is clearly formed on the focusing plate 6. The distance of the target 3 from the reference point is displayed as the refractive power of the combined optical system of the reference lens system L and the contact lens CL to be inspected by a scale plate 9.

The so-called soft contct lens abounds in flexibility and is unstable in shape and therefore the interface thereof with the reference lens system tends not to be uniform. For example, liquid such as physiological saline solution or the like is non-uniformly present between the reference lens system and the contact lens or the contact lens is sometimes joined with the reference lens system as the contact lens remains distorted, which may result in creation of measurement error. This also makes the apparatus very difficult to operate.

Reference Lens System Supporting Device

The measuring apparatus of the present invention is improved in such point and the support means 10 for the measurement is constructed as follows to enhance the measurement accuracy and operability. The support means for the apparatus for measuring the refractive power of the contact lens includes a base member having a through-opening for passing therethrough a light beam, and a cylindrical member installed on the base member. This cylindrical member may form a hermetically sealed air chamber by a contact lens to be inspected joined with a reference lens system disposed on the base member over the through-opening. The support means further includes a pressurizing means for increasing the air pressure within the hermetically sealed air chamber.

Figure 6:
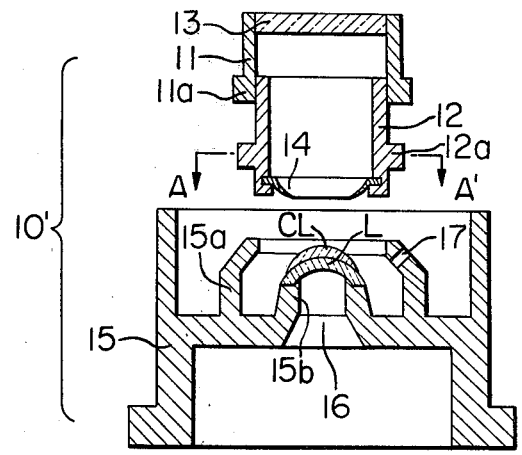
FIGS. 6 and 7 are longitudinal cross-sectional views of an embodiment of support means used in the measuring apparatus of the present invention.

An embodiment of the support means for the apparatus for measuring the refractive power of a contact lens will now be described. FIG. 6 is a cross-sectional view of an embodiment of the support means. This support means 10' includes a base member and a cylindrical member.

Figure 7:
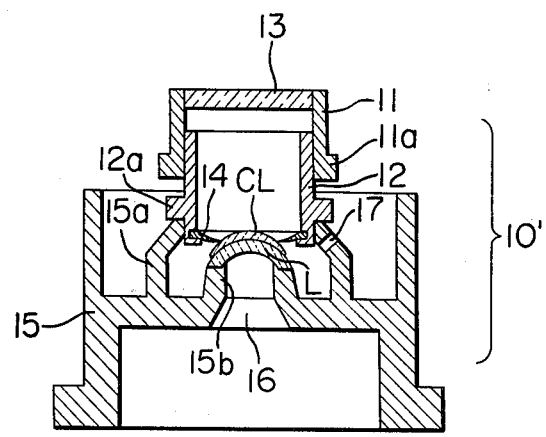
Figure 8:
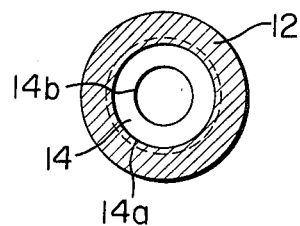
FIG. 8 is a transverse cross-sectional view taken along line A—A' in FIG. 6.

A first cylinder 11 at one end thereof is fitted over a second cylinder 12 coaxial with the first cylinder, and the two cylinders are slidable axially thereof relative to each other. A transparent parallel flat plate 13 is hermetically joined to the other end of the first cylinder 11 so as to cover the entire opening, and a ring-shaped, resilient member 14 formed of rubber or like material is provided on the inner wall of the second cylinder 12 adjacent to the other end thereof. A cross-section of the second cylinder along line A—A' is shown in FIG. 8. The outer peripheral portion 14a of the resilient, ring-shaped value member 14 is secured to the inner wall of the second cylinder 12, and the inner peripheral portion 14b thereof is resiliently movable axially thereof relative to the outer peripheral portion 14a. An annular stepped portion 11a has a tab for manually sliding the first cylinder 11 relative to the second cylinder 12 is provided on the outer wall of the first cylinder 11, and an annular stepped portion 12a engageable with a base member 15 (to be described) is provided on the outer wall of the second cylinder 12. The first cylinder 11 and the second cylinder 12 may be handled as a unit because of the friction therebetween and are installed on the base member 15. Integrally formed on the base member 15 are a cylindrical cylinder support portion 15a having an opening 17 through the side thereof and a cylindrical lens support portion 15b disposed inwardly of the support portion 15a and forming an extension of an opening 16 for passing therethrough a light beam. A reference lens system L is placed on the lens support portion 15b, and a contact lens CL to be inspected is in turn placed on the reference lens. The shown reference lens system comprises a single meniscus lens. On these, the first and second cylinders 11 and 12 are installed. The outer diameter of the second cylinder 12 is slightly smaller than the inner diameter of the end portion of the cylinder support portion 15a on the base member 15, so that the second cylinder is partly inserted into the cylinder support portion 15a and the annular stepped portion 12a is engaged with the end portion of the cylinder support portion 15a. Thus, as shown in FIG. 7, the first and second cylinders 11 and 12 are firmly installed with respect to the base member 15. At this time, the inner periphery 14b of the member 14 is resiliently engaged with the circumferential portion of the contact lens CL to be inspected, and a hermetically sealed air chamber is formed by the member 14, the contact lens CL, the first and second cylinders 11, 12 and the transparent, parallel flat plate 13. When the first cylinder 11 is depressed, the air pressure within the air chamber is increased and the resilient member 14 is pressed against the circumferential edge of the contact lens while the surface of the contact lens is uniformly pressed.

Therefore, the liquid intervening between the reference lens system L and the contact lens CL is discharged radially outwardly and the contact lens is sufficiently joined to the reference lens L, assuming the surface of the latter. Also, if the pressure within the air chamber is maintained at a suitable value, the clearance between the contact lens CL and the reference lens system L can be uniformly filled with liquid such as physiological saline solution and this is also useful for obtaining the refractive power of the contact lens in its actually worn condition. The first 11 and the second cylinder 12 may desirably be of a transparent material to facilitate observation of the inner contact lens. In the above-described construction, a cylindrical member is formed by a first and a second cylinder slidably fitted together, and the internal pressure of the air chamber is controlled by varying the volume of the air chamber formed by these cylinders and the contact lens, but the internal pressure control means may be formed by a single cylinder instead of the first and second cylinders and by means for introducing air from outside.

According to the method and apparatus of the present invention, as has hitherto been described, the value of the refractive power of a soft contact lens which is unstable in shape may be simply and accurately measured even if the refractive elements thereof are unknown. Further, the present invention enables the measurement to be effected by a conventional apparatus except the use of a reference lens system as described, and this is highly useful.

In the foregoing description, the measurement of a soft contact lens has been discussed, but the refractive power measuring method according to the present invention is applicable to the measurement of a hard contact lens. In this latter case, the amount of deformation of the contact lens is small because the material forming the contact lens is hard. Therefore, it is not possible to handle the hard contact lens just in the same way as the soft contact lens, but the refractive power can be likewise obtained by using a reference lens system having a curvature radius of the first surface slightly smaller than that of the second surface of the contact lens and by joining the two lenses together. Again in this case, it is of course possible to interpose an intermediate medium between the reference lens system and the contact lens to thereby approximately obtain the refractive power in the actually worn condition which is the composite refractive power of the contact lens and the tear liquid.

I claim:

1. A method of measuring the refractive power of a contact lens comprising:
   combining a reference lens system of small refractive power the refractive elements of which are known with a contact lens to be inspected;
   measuring the back focal distance of the combined optical system of the reference lens system and the contact lens combined together, namely, the distance from the vertex of the last refractive surface of the lens to the focus thereof; and
   determining the refractive power of the contact lens from the value of said back focal distance and the known value of said reference lens system.

2. A method according to claim 1, wherein the step of combining the reference lens system with the contact lens includes joining a second surface of the contact lens which can contact the cornea of an eye to a first surface of said reference lens system.

3. A method according to claim 2, wherein the step of joining the second surface of the contact lens to the first surface of the reference lens system includes selecting a reference lens system having a curvature radius of the first surface thereof substantially equal to that of the second surface of said contact lens.

4. A method according to claim 2 or 3, wherein the step of determining the refractive power of the contact lens includes calculating the following equation, expressed in the form of Gaussian brackets, provided said reference lens system includes m lenses, $$\psi = -\frac{A'_m}{B'_m} - \psi' \text{ where}$$

$$A'_m = -\left[\psi_2, -\frac{d_2}{n_2}, \ldots, -\frac{d_m}{n_m}, \psi_{m+1}\right] +$$

$$\left[\psi_2, -\frac{d_2}{n_2}, \ldots, -\frac{d_m}{n_m}\right] D$$

$$B'_m = -\left[-\frac{d_1}{n_1}, \psi_2 - \frac{d_2}{n_2}, \ldots, -\frac{d_m}{n_m}, \psi_{m+1}\right] +$$

$$\left[-\frac{d_1}{n_1}, \psi_2, -\frac{d_2}{n_2}, \ldots, -\frac{d_m}{n_m}\right] D$$

$$\left(\begin{array}{l} \psi'_1 = \frac{n_1 - 1}{r_1}, D = \frac{1}{l} \\ \\ \psi'_i = \frac{n_i - n_{i-1}}{r_i}, i = 2, 3, \ldots, m+1 \end{array}\right)$$

wherein $\psi$ represents the refractive power of said contact lens to be inspected, $l$ represents the back focal distance of the combined optical system of said reference lens system and the contact lens, $\psi_1$ represents the refractive power of the ith surface in the order from the first surface, $r_1, r_2, \ldots r_m, r_{m+1}$ represent respectively the successive radii of curvature of the reference lens system, $d_1, d_2, \ldots, d_m$ represent respectively the center thicknesses of the m lenses, and $n_1, n_2, \ldots, n_m$ represent respectively the refractive indices of the m lenses.

5. A method according to claim 2 or 3, wherein the step of determining the refractive power of the contact lens includes calculating the following equation, expressed in the form of Gaussian brackets, provided said reference lens system includes m lenses, $$\psi = -\frac{A_m}{B_m} - \psi'_1$$

$$\left(\psi'_1 = \frac{n_1 - 1}{r_1}\right)$$

where $$A_m = \left[\psi_2, -\frac{d_2}{n_2}, \ldots, -\frac{d_m}{n_m}, \psi_{m+1}, -l\right]$$

$$B_m = \left[-\frac{d_1}{n_1}, \psi_2, -\frac{d_2}{n_2}, \ldots, -\frac{d_m}{n_m}, \psi_{m+1}, -l\right]$$

$$\left(\psi_i = \frac{n_i - n_{i-1}}{r_i}, i = 2, 3, \ldots, m+1\right)$$

wherein $\psi$ represents the refractive power of said contact lens to be inspected, $l$ represents the back focal distance of the combined optical system of said reference lens system and the contact lens, $\psi_1$ represents the refractive power of the ith surface in the order from the first surface, $r_1, r_2, \ldots r_m, r_{m+1}$ represent respectively the successive radii of curvature of the reference lens system, $d_1, d_2, \ldots, d_m$ represent respectively the center thicknesses of the m lenses, and $n_1, n_2 \ldots, n_m$ represent respectively the refractive indices of the m lenses.

6. A combination of two reference lens systems, each to be used for measuring the refractive power of a contact lens, wherein one of said two reference lens systems comprises k lenses (including air lenses) having a curvature radius $r_1$ of the first surface, and the other comprises m lenses having a curvature radius $r_{1a}$ of the first surface which differs from $r_1$, the composite refractive powers of each reference lens system being zero, and said two reference lens systems satisfying the following two conditions:

$$\left[\psi'_1, -\frac{d_1}{n_1}, \psi_2, -\frac{d_2}{n_2}, \ldots, \psi_k, -\frac{d_k}{n_k}\right] =$$

$$\left[\psi'_{1a}, -\frac{d_{1a}}{n_{1a}}, \psi_{2a}, -\frac{d_{2a}}{n_{2a}}, \ldots, \psi_{ma}, -\frac{d_{ma}}{n_{ma}}\right]$$

$$\left[-\frac{d_1}{n_1}, \psi_2, -\frac{d_2}{n_2}, \psi_3, \ldots, \psi_k, -\frac{d_k}{n_k}\right] =$$

$$\left[-\frac{d_{1a}}{n_{1a}}, \psi_{2a}, -\frac{d_{2a}}{n_{2a}}, \psi_{3a}, \ldots, \psi_{ma}, -\frac{d_{ma}}{n_{ma}}\right]$$

where $$\psi'_1 = \frac{n_1 - 1}{r_1}, \psi'_{1a} = \frac{n_{1a} - 1}{r_{1a}}$$

$$\psi_i = \frac{n_i - n_{i-1}}{r_i}, \psi_{ia} = \frac{n_{ia} - n_{(i-1)a}}{r_{ia}}$$

$$(i = 2, 3, \ldots)$$

wherein $r_1, r_2, \ldots r_k, r_{k+1}$ represent the curvature radii of the successive lens surfaces of the reference lens system having the curvature radius $r_1$ of the first surface, $d_1, d_2, \ldots, d_k$ represent the center thicknesses of the successive lenses, $n_1, n_2, \ldots, n_k$ represent the refractive indices of the successive lenses, and $r_{1a}, r_{2a}, \ldots, r_{ma}, r_{(m+1)a}$, represent the curvature radii of the successive lens surfaces of the reference lens system having the curvature radius $r_{1a}$ of the first surface, $d_{1a}, d_{2a}, \ldots, d_{ma}$ represent the center thicknesses of the successive lenses, and $n_{1a}, n_{2a}, \ldots, n_{ma}$ represent the refractive indices of the successive lenses.

7. A device for supporting a reference lens system to which a contact lens to be inspected may be joined to measure the refractive power thereof comprising: a base member on which the reference lens system is disposed, said base member having a through-opening centrally thereof for passing therethrough a light beam; and, means for pressing the contact lens against the reference lens system by air pressure.

8. A device according to claim 7, wherein said pressing means includes first and second cylindrical members fitted together telescopically, the first and second cylindrical members being capable of effecting a hermetically sealed air chamber with the contact lens.

9. A device according to claim 8, wherein said pressing means further includes a resilient member provided on the inner wall of said second cylindrical member to contact the circumferential edge of the contact lens.

10. A device according to claim 9, wherein a transparent plate is secured to the first cylinder at the opposite end of which the second cylinder is fitted.

11. A device according to claim 8, wherein said base member has a through-opening for passing therethrough a light beam, a cylinder supporting portion on which said second cylinder member is installed, and a lens supporting portion forming an extension of said through-opening on which said reference lens is placed.

12. An apparatus for measuring the refractive power of a contact lens comprising:
 (a) a reference lens system having substantially zero power whose refractive elements are known;
 (b) measuring means for measuring the back focal distance of a combined optical system of said reference lens system and a contact lens to be inspected; and
 (c) support means for supporting said reference lens system and said contact lens on said measuring means, said support means including a base member on which the reference lens system is disposed and means for pressing the contact lens against the reference lens system.

13. An apparatus for measuring the refractive power of a contact lens comprising:
 (a) at least two reference lens systems each having substantially zero power and each including a first lens having a first surface different in curvature radius from the other;
 (b) measuring means for measuring the back focal distance of a combined optical system of one of said reference lens systems and a contact lens to be inspected; and
 (c) support means for supporting one of said reference lens systems and said contact lens on said measuring means, said support means including a base member on which one of said reference lens systems is disposed and means for pressing the contact lens against one of said reference lens systems.

14. An apparatus according to claim 13 wherein, between at least two reference lens systems the following values are maintained substantially constant $$\left\{ \begin{array}{l} \dfrac{d_1}{n_1} \\ \\ \psi_2 \end{array} \right.$$

where $d_1$ and $n_1$ represent the center thickness and index of refraction of said first lens of each reference lens system, and $\psi_2$ represents the refractive power of the second surface of said first lens of each reference lens system.

15. An apparatus according to claim 12 or 14, wherein said base member has a through-opening centrally thereof for passing therethrough a light beam, and said pressing means presses the contact lens against the reference lens system by air pressure.

16. An apparatus according to claim 15, further comprising a scale member for converting the value of the back focal distance into a value of refractive power of the contact lens to be inspected.

17. A reference lens system to be used in apparatus for measuring the refractive power of a contact lens wherein if the reference lens system comprises k lenses, the composite refractive power thereof is zero and the following two values, by the expression of Gaussian brackets, are maintained constant:

$$\left[ \psi'_1, -\frac{d_1}{n_1}, \psi_2, -\frac{d_2}{n_2}, \ldots, \psi_k, -\frac{d_k}{n_k} \right]$$

$$\left[ -\frac{d_1}{n_1}, \psi_2, -\frac{d_2}{n_2}, \psi_3, \ldots \psi_k, -\frac{d_k}{n_k} \right]$$

where $\psi$ represents the refractive power of each lens surface and is defined as $$\psi'_1 = \frac{n_1 - 1}{r_1}$$

$$\psi_i = \frac{n_i - n_{i-1}}{r_i}$$

$(i = 2, 3, \ldots)$ where $r_1, r_2, r_3, \ldots, r_k, r_k$ represent the curvature radii of the respective lens surfaces, $d_1, d_2, d_3, \ldots, d_k$ represent the center thickness of the respective lenses, and $n_1, n_2, n_3, \ldots, n_k$ represent the refractive indices of the respective lenses, whereby no compensation is necessary where a reference lens having a different curvature radius of the first surface is used to measure a contact lens having a different curvature radius of the second surface.

18. A combination of two reference lens systems, each to be used for measuring the refractive power of a contact lens, each of said reference lens systems having a first lens with each first lens having a first surface different in curvature radius from the other, and wherein said two reference lens systems satisfy the following two conditions:

$$\frac{d_1}{n_1} = \frac{d_{1a}}{n_{1a}}$$

$$\psi_2 = \psi_{2a}$$

wherein $d_1$ and $n_1$ represent the center thickness and index of refraction of the first lens of one of said reference lens systems; $d_{1a}$ and $n_{1a}$ represent the center thickness and index of refraction of the first lens of said other of said reference lens systems; $\psi_2$ represents the refractive power of the second surface of said one of the reference lens systems; and $\psi_{2a}$ represents the refractive power of the second surface of said other of the reference lens systems.

19. A reference lens system to be used in apparatus for measuring the refractive power of a contact lens, wherein said reference lens system comprises a single lens having zero refractive power and the following two values, by the expression of Gaussian brackets, are maintained constant:

$$\left[ \psi'_1 - \frac{d_1}{n_1} \right]$$

$$\left[ -\frac{d_1}{n_1} \right]$$

where $\psi_1'$ is defined as: $\psi_1' = (n_1 - 1)/r_1$ where $r_1$ represents the curvature radius of the first surface of the single lens adjacent to the contact lens to be measured, $d_1$ represents the center thickness of the single lens, and $n_1$ represents the refractive index of the single lens, whereby no compensation is necessary where a reference lens having a different curvature radius of the first surface is used to measure a contact lens having a different curvature radius of the second surface.

* * * * *

UNITED STATES PATENT AND TRADEMARK OFFICE
CERTIFICATE OF CORRECTION

PATENT NO. : 4,395,120

DATED : July 26, 1983

INVENTOR(S) : FUMIO TAKAHASHI

It is certified that error appears in the above-identified patent and that said Letters Patent is hereby corrected as shown below:

Column 2, lines 40-45 (formula (1)), all occurrences, "$\phi$" should be --$\psi$--.

Column 3, line 52, "$r_2 \infty$" should be --$r_2 = \infty$--.

Column 4, lines 55-57 (last line of formula (5))

"$\dfrac{n_{i-1} - n_i}{r_i}$" should be $\dfrac{n_i - n_{i-1}}{r_i}$ --

Column 5, line 31, "becomes" should be --become--;

line 55, "constant" should be --contact--.

UNITED STATES PATENT AND TRADEMARK OFFICE
CERTIFICATE OF CORRECTION

PATENT NO. : 4,395,120

DATED : July 26, 1983

INVENTOR(S) : FUMIO TAKAHASHI

It is certified that error appears in the above-identified patent and that said Letters Patent is hereby corrected as shown below:

Column 7, line 31, "smaller" should be --similar--.

Column 9, line 24, "$N_2$" should be --$n_2$--.

Column 11, between lines 11 and 12, insert centered heading as follows: --Measuring Apparatus--;

line 12, "measuring apparatus" should be --hydrophilic--;

line 38, "contct" should be --contact--.

Column 12, line 4, "contct" should be --contact--.

UNITED STATES PATENT AND TRADEMARK OFFICE
CERTIFICATE OF CORRECTION

PATENT NO. : 4,395,120

DATED : July 26, 1983

INVENTOR(S) : FUMIO TAKAHASHI

Page 3 of 3

It is certified that error appears in the above-identified patent and that said Letters Patent is hereby corrected as shown below:

Claim 17, Column 18, line 1, "$r_k 6$" should be --$r_{k+1}$--.

Claim 19, Column 18, line 57, "$(n_1 - 1)/r_1)$ should read: --$\dfrac{n_1 - 1}{r_1}$--.

Signed and Sealed this

Fourth Day of December 1984

[SEAL]

Attest:

GERALD J. MOSSINGHOFF

Attesting Officer

Commissioner of Patents and Trademarks